Patented Feb. 26, 1952

2,587,280

UNITED STATES PATENT OFFICE 2,587,280

INCREASING THE MECHANICAL STABILITY OF FORMALDEHYDE-PRESERVED NATURAL RUBBER LATEX

Edward M. Bevilacqua, Ramsey, N. J., assignor to United States Rubber Company, New York, N. Y., a corporation of New Jersey No Drawing. Application February 2, 1950, Serial No. 142,083

8 Claims. (Cl. 260—820)

This invention relates to increasing the mechanical stability of formaldehyde-preserved natural rubber latex.

Natural Hevea rubber latex is commonly preserved today with ammonia. It is also known to preserve latex with formaldehyde, and this has the advantage that the solid rubber derived from formaldehyde-preserved latex is much softer than the rubber derived from ammonia-preserved latex, and this is desirable in many manufacturing processes. Rubber from ammonia-preserved latex has a Mooney viscosity of around 115 to 160, and rubber from formaldehyde-preserved latex has a Mooney viscosity of around 58 to 69, as measured at 100° C. by the Mooney shearing disc plastometer described by M. Mooney in Industrial and Engineering Chemistry, Anal. Ed. 6, 147 (1934). However, such formaldehyde-preserved latex thickens rapidly with age, and in a few months becomes too thick for direct use in manufacturing processes. Volatile secondary and tertiary amines have been added to formaldehyde preserved latex to prevent this thickening on ageing, and to give a formaldehyde-preserved latex which will remain fluid over a long period of time. However, there is still a serious disadvantage to the use of such latices in manufacturing processes because of their very low mechanical stability. The mechanical stability of formaldehyde-preserved latices, including those where there has also been added a volatile amine to maintain the requisite fluidity over a long period of time, is much lower than the mechanical stability of ammonia-preserved latices, and is too low for many commercial usages. Some conventional surface-active agents will effectively increase the mechanical stability of formaldehyde-preserved latices when used in amounts of 1% or more, but they are ineffective at low concentrations, as up to 0.2%. Other conventional surface-active agents will coagulate formaldehyde-preserved latices when used in amounts of 1% or more. All percentages and parts referred to herein are by weight. Such large amounts as 1% of added surface-active agents which will increase the mechanical stability of the latex are commercially impractical, and may impart various difficulties to the use of the latex in manufacturing operations and introduce undesirable properties to the final rubber products made from the latex.

The object of the present invention is to increase effectively the mechanical stability of formaldehyde-preserved latex without adding more than 0.2% by weight of a material based on the latex. The terms "natural rubber latex" and "latex" are used herein to designate the latex of the Hevea brasiliensis tree, and unless otherwise specified include normal and concentrated Hevea brasiliensis latex.

According to the present invention, the mechanical stability of formaldehyde-preserved latex is effectively increased by incorporating in the latex a small amount of water-soluble polyvinyl alcohol.

In carrying out the present invention, 0.01% to 0.2%, based on the latex, of water-soluble polyvinyl alcohol is incorporated in the formaldehyde-preserved latex, which may be normal or concentrated. The amount of formaldehyde that is added to the freshly tapped latex may be from 0.1 to 1%. The addition of the formaldehyde to the freshly tapped latex reduces the pH from about 7 to a value in the range 5.5 to 6.8 depending on the amount of formaldehyde used. The formaldehyde is distributed throughout the serum of the uncoagulated latex, and on removal of serum in the concentration of the latex as by centrifuging or chemical creaming, the formaldehyde content of the cream may be lowered to as little as 0.03%. Further formaldehyde may be added to the concentrated latex if desired. For increasing the fluidity of the latex on standing, it is sometimes desirable to also add 0.1 to 1%, based on the latex, of a volatile saturated, secondary or tertiary amine, e. g., dimethylamine, trimethylamine, diethylamine, triethylamine, or morpholine. Such volatile amine may be added to the unconcentrated or concentrated latex, or may be added both before and after concentration. The pH of such latices containing about 0.03 to 1% of formaldehyde and 0.1 to 1% of volatile secondary or tertiary amine will generally be in the range of 6 to 10.5. Such volatile secondary and tertiary amines do not react in the latex with the formaldehyde as do ammonia or primary amines, and hence the latices retain the desirable property of yielding the low viscosity rubber, of Mooney 58 to 69, characteristic of formaldehyde-preserved latices, although they are still low in mechanical stability. On the other hand, the preservation of latex by the addition of formaldehyde and ammonia in amount in excess of that required to react with the formaldehyde, as in U. S. Patent 1,872,161, gives a latex of high mechanical stability, but such a latex is essentially an ammonia-preserved latex and the rubber has the usual high Mooney viscosity of around 115 to 160.

Polyvinyl alcohol is produced by hydrolysis of polyvinyl acetate, wherein commonly about 50% to 100% of the acetate groups are removed and replaced by OH groups. Polyvinyl alcohols with 70% to 100% hydrolysis of the acetate groups, or in which 70% to 100% of the vinyl units are vinyl alcohol units, are water-soluble and may be used in the present invention. The term "water-soluble polyvinyl alcohol" is used herein to designate such polyvinyl alcohols in which 70% to 100% of the vinyl units are vinyl alcohol units. It thus excludes those polyvinyl alcohols which are insoluble in water (up to about 60% hydrolyzed, or where up to about 60% of the vinyl units are vinyl alcohol units), and those which exhibit retrograde solubility in water with rising temperature (above 60% and less than 70% hydrolyzed, or where over 60% and less than 70% of the vinyl units are vinyl alcohol units). Intrinsic viscosities are used to distinguish or compare polyvinyl alcohols of different molecular weights. Polyvinyl alcohols having intrinsic viscosities in water in the range from 0.1 to 3.5 may be used in the present invention. Such polyvinyl alcohols include the so-called low viscosity, medium viscosity, and high viscosity polyvinyl alcohols. The examples below will illustrate the use of polyvinyl alcohols of various degrees of hydrolysis and of various viscosities in the present invention.

The polyvinyl alcohol may be added to the latex at the plantations when the latex is initially treated with formaldehyde, with or without a volatile secondary or tertiary amine, or it may be added to such formaldehyde-preserved latex after preservation and before shipment from the plantations, or it may be added to the formaldehyde-preserved latex after arrival in the country to which it is exported. If the latex is to be concentrated, the polyvinyl alcohol will generally be added after concentration, to prevent waste of the material. The formaldehyde-preserved latex, which may or may not contain additional volatile secondary or tertiary amine, will have sufficient mechanical stability to withstand shipment, but it should have its mechanical stability effectively increased for use in manufacturing processes. The addition to the latex of up to 0.2% of polyvinyl alcohol has no significant effect on properties of the latex other than effectively to increase its mechanical stability. The viscosity of the latex is increased slightly. Coagulation of the latex by salt or by acid is not hindered. Cured films of rubber made from the latex are indistinguishable from those made without addition of polyvinyl alcohol.

In the work to be described below illustrating the invention, the mechanical stability of the latices was measured by the method described in "Examination of Rubber Latex and Rubber Latex Compounds" by Jordan, Brass, and Roe, Ind. and Eng. Chem. 9, 182–198, the particular test for "Mechanical Stability" being found on pages 188 and 189. In the mechanical stability determinations, fifty milliliters of latex in a jacketed stainless steel vessel 3.8 cm. square were stirred with a propeller blade driven by a high speed Hamilton Beach motor running at 18,000 R. P. M. The temperature was kept at 25° C. Stabilities are reported in seconds, this being the number of seconds to coagulation as described in the Jordan, Brass, and Roe publication. Ammonia-preserved latices, including those latices to which there is added formaldehyde and an excess of ammonia over that required to react with the formaldehyde as in U. S. Patent 1,872,161, have mechanical stabilities greater than 400 seconds. It is not necessary to increase the mechanical stabilities of such latices.

*Example I*

A latex was preserved in Malaya by adding 0.15% of formaldehyde and 0.3% of dimethylamine, based on the latex, followed shortly by centrifuging, and then adding a further 0.3% of dimethylamine, based on the concentrated latex, giving a concentrated latex containing about 0.05% of formaldehyde and 0.4% of dimethylamine. The centrifuged latex as imported into the United States had a solids content of 63.5%, a pH of 8.5, and a mechanical stability of 120 seconds. The addition to separate portions of the concentrated latex of 0.05% and 0.10% of a polyvinyl alcohol in which about 75% of the vinyl units were vinyl alcohol units and which had an intrinsic viscosity in water of about 0.2% increased the mechanical stability to 375 and 800 seconds, respectively.

*Example II*

The addition to separate portions of the concentrated latex used in Example I of 0.05% of six different polyvinyl alcohols in which 88%, 75%, 88%, 99%, 99%, and 99% of the vinyl units were vinyl alcohol units, and which had intrinsic viscosities in water of about 0.4, 3, 1.2, 0.4, 1.1, and 1.6 respectively, increased the mechanical stability to 310, 285, 330, 257, 295, and 328 seconds, respectively.

*Example III*

A latex preserved in Malaya with 0.4% of formaldehyde was imported into the United States where it was found to have a solids concentration of 37.3%, a pH of 5.8, and a mechanical stability of 100 seconds. The addition of 0.05% of the polyvinyl alcohol used in Example I, increased the mechanical stability of the latex to 295 seconds.

*Example IV*

A latex was preserved in Malaya with 0.4% of formaldehyde and 0.3% of morpholine. It was imported into the United States where it was centrifuged, giving a solids concentration of 61.5%, a pH of 6.4, and a mechanical stability of 38 seconds. The addition to the concentrated latex of 0.05% of the polyvinyl alcohol used in Example I increased the mechanical stability of the latex to 275 seconds.

*Example V*

A latex was preserved in Malaya with 0.15% of formaldehyde and 0.3% of morpholine, and was then centrifuged. To the centrifuged product were added 0.3% of formaldehyde and 0.3% of morpholine, and the concentrate was imported into the United States where it was found to have a solids concentration of 63.6%, a pH of 6.7, and a mechanical stability of 88 seconds. The addition to the concentrated latex of 0.05% of the polyvinyl alcohol used in Example I increased the mechanical stability of the latex to 470 seconds.

*Example VI*

A latex was preserved in Malaya with 0.4% of formaldehyde and 0.2% of trimethylamine. It was imported into the United States where it was centrifuged, followed by addition of 0.12% of trimethylamine, based on the concentrated latex. The concentrated latex had a pH of 8.5, a solids concentration of 60.5%, and a mechanical stability of 55 seconds. The addition to the concentrated latex of 0.05% of the polyvinyl alcohol used in Example I increased the mechanical stability to 240 seconds.

In general, conventional anionic, cationic or nonionic surface-active agents containing long chain hydrophobic groups do not effectively increase the mechanical stability of formaldehyde-preserved latices when added in the small amounts (0.01 to 0.2% based on the latex) used with polyvinyl alcohol according to the present invention. For example, 0.05% of the following surface-active agents containing hydrophobic groups, when added to the latex of Example I, gave mechanical stabilities of less than 200 seconds, which shows the ineffectiveness of such surface-active agents to raise the mechanical stability as compared with the polyvinyl alcohol of the present invention: dioctyl ester of sodium sulfo-succinic acid, sodium sulfate derivative of 7-ethyl-2-methyl-undecanol-4.

$$C_{17}H_{33}CON(CH_3)C_2H_4SO_3Na$$

alkyl naphthalene sodium sulfonates, condensation product of formaldehyde with sodium naphthalene sulfonate, stearyl dimethyl benzyl ammonium chloride, benzyl triethyl ammonium chloride, nonaethylene glycol oleate and laurate and stearate, mono- and poly-esters of sorbitan and long chain fatty acids, e. g. sorbitan monolaurate and monoleate and monostearate and sorbitan trioleate and tristearate, reaction products of ethylene oxide with such mono- and poly-esters of sorbitan and long chain fatty acids, condensation products of ethylene oxide with oleic acid and with oleyl alcohol and with tall oil acids.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the mechanical stability of formaldehyde-preserved natural Hevea rubber latex having a pH between 5.5 and 6.8 which comprises incorporating in the latex 0.01 to 0.2% of water-soluble polyvinyl alcohol.

2. The method of increasing the mechanical stability of natural Hevea rubber latex containing 0.03 to 1% of formaldehyde which comprises incorporating in said latex 0.01 to 0.2% of water-soluble polyvinyl alcohol.

3. The method of increasing the mechanical stability of natural Hevea rubber latex containing 0.03 to 1% of formaldehyde and 0.1 to 1% of an amine of the group consisting of dimethylamine, trimethylamine, diethylamine, triethylamine, and morpholine, which comprises incorporating in said latex 0.01 to 0.2% of water-soluble polyvinyl alcohol.

4. The method of increasing the mechanical stability of natural Hevea rubber latex containing 0.03 to 1% of formaldehyde and 0.1 to 1% of morpholine which comprises incorporating in said latex 0.01 to 0.2% of water-soluble polyvinyl alcohol.

5. A formaldehyde-preserved natural Hevea rubber latex having a pH between 5.5 and 6.8 and containing 0.01 to 0.2% of water-soluble polyvinyl alcohol.

6. A natural Hevea rubber latex containing 0.03 to 1% of formaldehyde and 0.01 to 0.2% of water-soluble polyvinyl alcohol.

7. A natural Hevea rubber latex containing 0.03 to 1% of formaldehyde, 0.1 to 1% of an amine of the group consisting of dimethylamine, trimethylamine, diethylamine, triethylamine, and morpholine, and 0.01 to 0.2% of water-soluble polyvinyl alcohol.

8. A natural Hevea latex containing 0.03 to 1% of formaldehyde, 0.1 to 1% of morpholine, and 0.01 to 0.2% of water-soluble polyvinyl alcohol.

EDWARD M. BEVILACQUA.

REFERENCES CITED

The following references are of record in the file of this patent:

UNITED STATES PATENTS

| Number | Name | Date |
|---|---|---|
| 1,872,161 | McGavach | Aug. 16, 1932 |
| 2,138,073 | Schweitzer | Nov. 29, 1938 |
| 2,327,115 | Linscott | Aug. 17, 1943 |

FOREIGN PATENTS

| Number | Country | Date |
|---|---|---|
| 593,339 | Great Britain | Oct. 14, 1947 |